US012720466B2

(12) United States Patent
Thomas et al.

(10) Patent No.: US 12,720,466 B2
(45) Date of Patent: Aug. 25, 2026

(54) APPARATUSES, METHODS, AND NETWORK NODES FOR POSITIONING REPORTING ENHANCEMENTS OVER UNLICENSED BANDS

(71) Applicant: Lenovo (Singapore) Pte. Ltd., New Tech Park (SG)

(72) Inventors: Robin Thomas, Bad Nauheim (DE); Karthikeyan Ganesan, Kronberg im Taunus (DE); Ankit Bhamri, Rödermark (DE); Ali Ali, Kraiburg am Inn (DE); Alexander Golitschek Edler von Elbwart, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 293 days.

(21) Appl. No.: 18/290,688

(22) PCT Filed: Jul. 15, 2022

(86) PCT No.: PCT/IB2022/056516

§ 371 (c)(1), (2) Date: Jan. 19, 2024

(87) PCT Pub. No.: WO2023/002314

PCT Pub. Date: Jan. 26, 2023

(65) Prior Publication Data

US 2025/0097876 A1 Mar. 20, 2025

Related U.S. Application Data

(60) Provisional application No. 63/223,471, filed on Jul. 19, 2021.

(51) Int. Cl.
*H04W 64/00* (2009.01)
*H04W 74/04* (2009.01)

(52) U.S. Cl.
CPC ........... *H04W 64/00* (2013.01); *H04W 74/04* (2013.01)

(58) Field of Classification Search
CPC .............................. H04W 64/00; H04W 74/04
See application file for complete search history.

(56) References Cited

U.S. PATENT DOCUMENTS 10,334,554 B2 * 6/2019 Lee ....................... H04L 5/0098
10,912,128 B2 * 2/2021 Li ......................... H04L 5/0037
(Continued)

FOREIGN PATENT DOCUMENTS

CN 114071739 A * 2/2022 ............ H04W 72/23
EP 3407659 A1 11/2018
(Continued)

OTHER PUBLICATIONS

PCT/IB2022/056516, "Notification of Transmittal of the International Search Report and the Written Opinion of the International Searching Authority, or the Declaration", International Searching Authority, Oct. 27, 2022, pp. 1-10.
(Continued)

*Primary Examiner* — Hai V Nguyen
(74) *Attorney, Agent, or Firm* — Kunzler Needham & Hilton; Bruce R. Needham

(57) ABSTRACT

Apparatuses, methods, and systems for positioning reporting enhancements over unlicensed bands. A method in a user equipment (UE) includes determining a channel occupancy time (COT) value; determining a time to a next positioning measurement report, determining a maximum COT associated with the determined COT, and generating and transmitting a positioning measurement report at the determined COT responsive to the maximum COT being at least greater than a combination of a window size of a previously determined positioning reference signal (PRS), the deter-
(Continued)

mined time to the next positioning measurement report, and a predetermined reporting window size. The method also includes transmitting the generated positioning measurement report at a next available COT responsive to a time instance in which the positioning measurement report is ready and the determined COT meeting a predefined position latency requirement responsive to the maximum COT not being at least greater than the combination.

20 Claims, 7 Drawing Sheets

(56) References Cited

U.S. PATENT DOCUMENTS 11,405,888 B2 * 8/2022 Yerramalli .............. H04L 5/005
11,632,795 B2 * 4/2023 Kim .................. H04W 72/0446 370/329
11,785,649 B2 * 10/2023 Li ........................ H04B 7/0639 370/329
11,812,474 B2 * 11/2023 Xue .................... H04W 74/002
11,889,551 B2 * 1/2024 Fazili ................ H04W 74/0808
11,950,280 B2 * 4/2024 Lyer .................... H04W 74/006
12,041,657 B2 * 7/2024 Xue .................... H04W 72/232
12,075,491 B2 * 8/2024 Oh ...................... H04W 74/085
12,082,253 B2 * 9/2024 Wang .................. H04W 74/002
12,127,249 B2 * 10/2024 Li ..................... H04W 74/0808
12,132,680 B2 * 10/2024 Kundu ................ H04L 27/0006
12,225,443 B2 * 2/2025 Liao ................. H04N 21/44008
12,245,276 B2 * 3/2025 Wang ................ H04W 74/0808
12,267,814 B2 * 4/2025 Oviedo ............. H04W 72/0446
12,273,922 B2 * 4/2025 Harada ............. H04W 74/0808
12,426,065 B2 * 9/2025 Takahashi ............. H04L 1/1607
12,426,071 B2 * 9/2025 Zhang ................... H04W 72/50
12,477,578 B2 * 11/2025 Bhattad ............ H04W 74/0808
12,490,304 B2 * 12/2025 Jiang ................ H04W 74/0816
2017/0257879 A1 * 9/2017 Kang ................ H04W 74/0816
2018/0054792 A1 * 2/2018 Lee ........................ H04B 17/24
2018/0343056 A1 11/2018 Radulescu et al.
2020/0028583 A1 1/2020 Radulescu et al.
2021/0092768 A1 * 3/2021 Kim .................. H04W 74/0816
2021/0112520 A1 * 4/2021 Yerramalli ............ H04W 80/02
2021/0251001 A1 * 8/2021 Wu ....................... H04L 5/0048
2021/0400732 A1 * 12/2021 Xue .................... H04W 74/002
2022/0070922 A1 * 3/2022 Talarico ............ H04W 72/1268
2022/0095301 A1 * 3/2022 Oviedo ................... H04L 5/001
2022/0124469 A1 * 4/2022 Liao ........................ H04W 4/50
2022/0131725 A1 * 4/2022 Li ......................... H04L 5/0053
2022/0166586 A1 * 5/2022 Kundu .................. H04L 5/0037
2022/0167402 A1 * 5/2022 Liu ....................... H04W 28/04
2022/0167407 A1 * 5/2022 Oviedo ............. H04W 72/0446
2022/0174735 A1 * 6/2022 Li ..................... H04W 74/0816
2022/0286998 A1 * 9/2022 Dwivedi ............... H04W 64/00
2022/0304058 A1 * 9/2022 Wang ................ H04W 72/0446
2023/0156784 A1 * 5/2023 Liu ...................... H04B 17/318 370/252
2023/0163916 A1 * 5/2023 Huang .................. H04L 5/0048 370/329
2023/0164828 A1 * 5/2023 Uesaka ............. H04W 74/0816 370/329
2023/0164829 A1 * 5/2023 Park ...................... H04W 74/04 370/329
2023/0188964 A1 * 6/2023 Pateromichelakis ... H04L 67/34 709/218
2023/0189304 A1 * 6/2023 Zhang ................... H04W 72/50 370/329
2023/0209370 A1 * 6/2023 Pateromichelakis .. G06N 20/00 370/328
2023/0246724 A1 * 8/2023 Pateromichelakis .. H04J 11/005 370/329
2023/0254895 A1 * 8/2023 Xue ...................... H04L 5/0053 370/329
2023/0319885 A1 * 10/2023 Bagheri ............ H04W 74/0808 370/329
2023/0337043 A1 * 10/2023 Pateromichelakis ........................ H04W 28/0263
2023/0345551 A1 * 10/2023 Hwang ................. H04L 1/1887
2023/0354275 A1 * 11/2023 Moon ............... H04W 72/0446
2023/0362989 A1 * 11/2023 Bagheri ............ H04W 74/0808
2024/0064814 A1 * 2/2024 Park ....................... H04B 7/088
2024/0187071 A1 * 6/2024 Li ......................... H04W 24/10
2024/0196178 A1 * 6/2024 Ying ....................... H04W 8/18
2024/0298194 A1 * 9/2024 Mueck ................... G06N 20/00
2024/0334476 A1 * 10/2024 Hwang ................. H04W 72/25
2024/0365322 A1 * 10/2024 Islam .................... H04W 72/20
2024/0373435 A1 * 11/2024 Thomas ................ G01S 5/0236
2025/0070943 A1 * 2/2025 Thomas ................ H04W 72/40
2025/0071724 A1 * 2/2025 Huang ................. H04W 4/029
2025/0081212 A1 * 3/2025 Yu ......................... H04L 5/0048
2025/0151086 A1 * 5/2025 Talarico ................ H04W 72/25
2025/0176017 A1 * 5/2025 Talarico ............ H04W 74/0808
2025/0247858 A1 * 7/2025 Talarico ............ H04W 74/0808
2025/0331003 A1 * 10/2025 Chien ............... H04W 74/0808
2025/0344039 A1 * 11/2025 Zhang ................... H04W 4/025

FOREIGN PATENT DOCUMENTS

EP 4290970 A1 * 12/2023 ........ H04W 74/0816
KR 20220090514 A * 6/2022 ........ H04W 74/0875
WO 2015138178 A1 9/2015
WO WO-2020146739 A1 * 7/2020 ........ H04W 74/0833

OTHER PUBLICATIONS

ETSI, “5 GHz RLAN; Harmonised Standard covering the essential requirements of article 3.2 of Directive 2014/53/EU”, ETSI EN 301 893 V2.1.1, May 2017, pp. 1-122.

Qualcomm Inc., “Initial thoughts on Potential Positioning Enhancements”, 3GPP TSG RAN WG1 #101-eR1-2004492, May 25-Jun. 5, 2020, pp. 1-14.

Qualcomm Inc., “Potential Enhancements for NR Rel-17 Positioning”, 3GPP TSG RAN WG1 #102-eR1-2006810, Aug. 17-28, 2020, pp. 1-21.

3GPP, “3rd Generation Partnership Project; Technical Specification Group Radio Access Network; Study on NR-based access to unlicensed spectrum (Release 16)”, 3GPP TR 38.889 V16.0.0, Dec. 2018, pp. 1-119.

3GPP, “3rd Generation Partnership Project; Technical Specification Group Services and System Aspects; Service requirements for cyber-physical control applications in vertical domains; Stage 1 (Release 18)”, 3GPP TS 22.104 V18.1.0, Jun. 2021, pp. 1-81.

3GPP, “3rd Generation Partnership Project; Technical Specification Group Services and System Aspects; Service requirements for the 5G system; Stage 1 (Release 18)”, 3GPP TS 22.261 V18.3.0, Jun. 2021, pp. 1-91.

3GPP, “3rd Generation Partnership Project; Technical Specification Group Radio Access Network; LTE Positioning Protocol (LPP) (Release 16)”, 3GPP TS 37.355 V16.4.0, Mar. 2021, pp. 1-298.

3GPP, “3rd Generation Partnership Project; Technical Specification Group Radio Access Network; NR; Physical channels and modulation (Release 16)”, 3GPP TS 38.211 V16.6.0, Jun. 2021, pp. 1-134.

3GPP, “3rd Generation Partnership Project; Technical Specification Group Radio Access Network; NR; Physical layer procedures for data (Release 16)”, 3GPP TS 38.214 V16.6.0, Jun. 2021, pp. 1-172.

3GPP, “3rd Generation Partnership Project; Technical Specification Group Radio Access Network; NR; Physical layer measurements (Release 16)”, 3GPP TS 38.215 V16.4.0, Dec. 2020, pp. 1-25.

3GPP, “3rd Generation Partnership Project; Technical Specification Group Radio Access Network; NG Radio Access Network (NG-RAN); Stage 2 functional specification of User Equipment (UE) positioning in NG-RAN (Release 16)”, 3GPP TS 38.305 V16.4.0, Mar. 2021, pp. 1-119.

3GPP, “3rd Generation Partnership Project; Technical Specification Group Radio Access Network; NR; Radio Resource Control (RRC)

(56) References Cited

OTHER PUBLICATIONS protocol specification (Release 16)", 3GPP TS 38.331 V16.4.0, Mar. 2021, pp. 1-949.

* cited by examiner

APPARATUSES, METHODS, AND NETWORK NODES FOR POSITIONING REPORTING ENHANCEMENTS OVER UNLICENSED BANDS

FIELD

The subject matter disclosed herein relates generally to wireless communications and more particularly relates to apparatuses, method, and systems for positioning reporting enhancements over unlicensed bands.

BACKGROUND

In certain wireless communications networks, unlicensed bands may be used.

BRIEF SUMMARY

Methods for positioning reporting enhancements over unlicensed bands. Apparatuses, systems, and network entities also perform the functions of the methods. One embodiment of a method in a user equipment (UE) includes determining a channel occupancy time (COT) value; determining a time to a next positioning measurement report, determining a maximum COT value associated with the determined COT value, and generating and transmitting a positioning measurement report at the determined COT value responsive to the maximum COT being at least greater than a combination of a window size of a previously determined positioning reference signal (PRS), the determined time to the next positioning measurement report, and a predetermined reporting window size. The method also includes transmitting the generated positioning measurement report at a next available COT responsive to a time instance in which the positioning measurement report is ready and the determined COT value meeting a predefined position latency requirement responsive to the maximum COT value not being at least greater than the combination.

One embodiment of an apparatus includes a transceiver, a processor in communication with the transceiver, and a memory that stores code. The code is executable by the processor to determine a COT value, determine a time to a next positioning measurement report, determine a maximum COT value associated with the determined COT value, and generate and transmit a positioning measurement report at the determined COT value responsive to the maximum COT being at least greater than a combination of a window size of a previously determined positioning reference signal (PRS), the determined time to the next positioning measurement report, and a predetermined reporting window size. The code also causes the processor to transmit the generated positioning measurement report at a next available COT responsive to a time instance in which the positioning measurement report is ready and the determined COT value meeting a predefined position latency value, responsive to the maximum COT value not being at least greater than the combination.

One embodiment of a network entity includes a transceiver, a processor in communication with the transceiver, and a memory that stores code executable by the processor to receive a COT value from a target UE or a location management function server and share the COT value with other UEs within a predefined area relative to the target UE or the network entity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
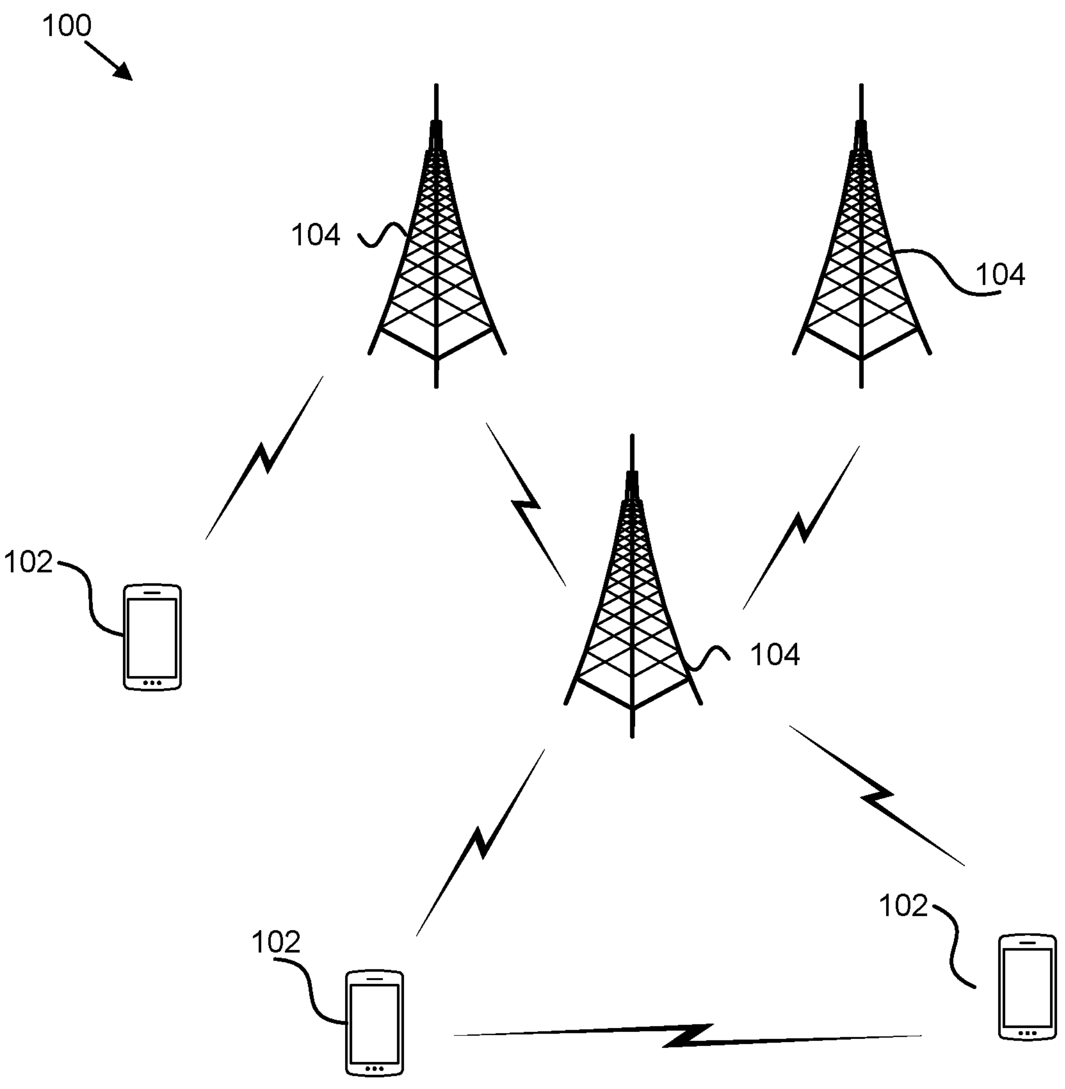
FIG. 1 is a schematic block diagram illustrating one embodiment of a wireless communication system for positioning reporting enhancements over unlicensed bands.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some various embodiments, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for positioning reporting enhancements over unlicensed bands. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In various embodiments, the wireless communication system 100 is compliant with the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may be used for positioning reporting enhancements over unlicensed bands.

In certain embodiments, a network unit 104 may be used for positioning reporting enhancements over unlicensed bands.

Figure 2:
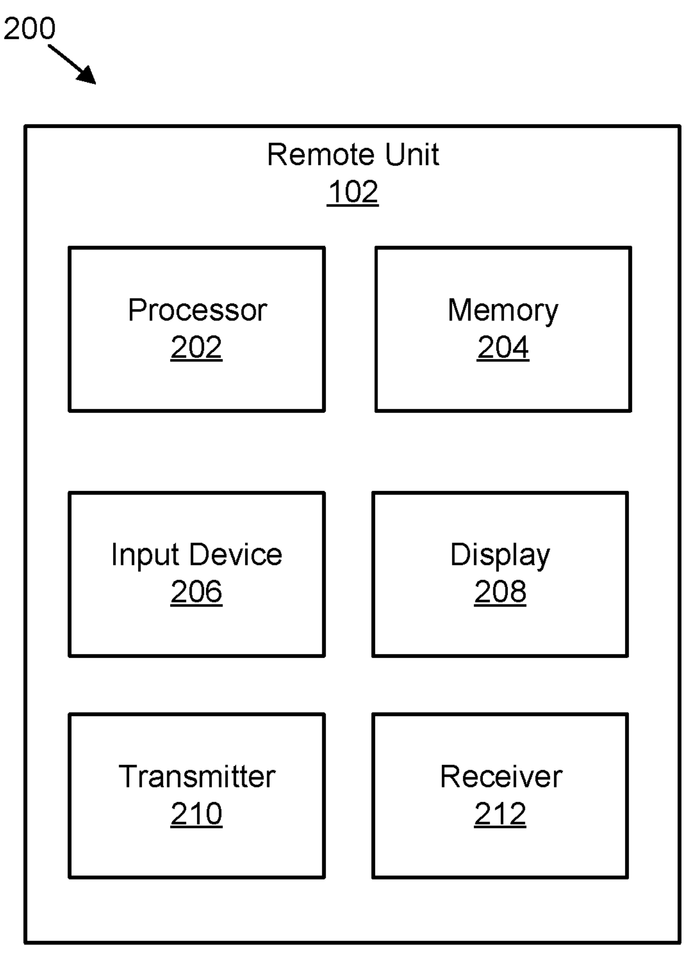
FIG. 2 is a schematic block diagram illustrating one embodiment of an apparatus that may be used for positioning reporting enhancements over unlicensed bands.

FIG. 2 depicts one embodiment of an apparatus 200 that may be used for positioning reporting enhancements over unlicensed bands. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
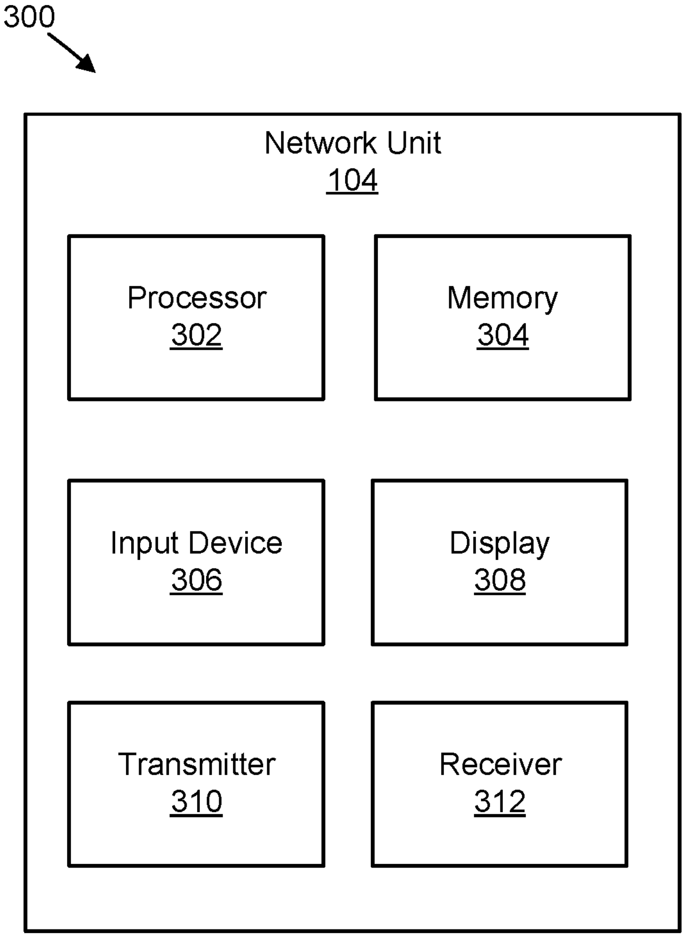
FIG. 3 is a schematic block diagram illustrating another embodiment of an apparatus that may be used for positioning reporting enhancements over unlicensed bands.

FIG. 3 depicts one embodiment of an apparatus 300 that may be used for positioning reporting enhancements over unlicensed bands. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

FIGS. 4 through 7 illustrate various embodiments described herein.

The present disclosure provides a set of enabling features to realize radio access technology (RAT)-dependent positioning in unlicensed scenarios using the supported methods. New radio-unlicensed (NR-U) provides wireless communications in unlicensed bands (spectrum). Operating in the unlicensed band brings about flexibility in terms aggregating/utilizing additional bandwidths, which improves the overall positioning performance in terms of accuracy.

Figure 4:
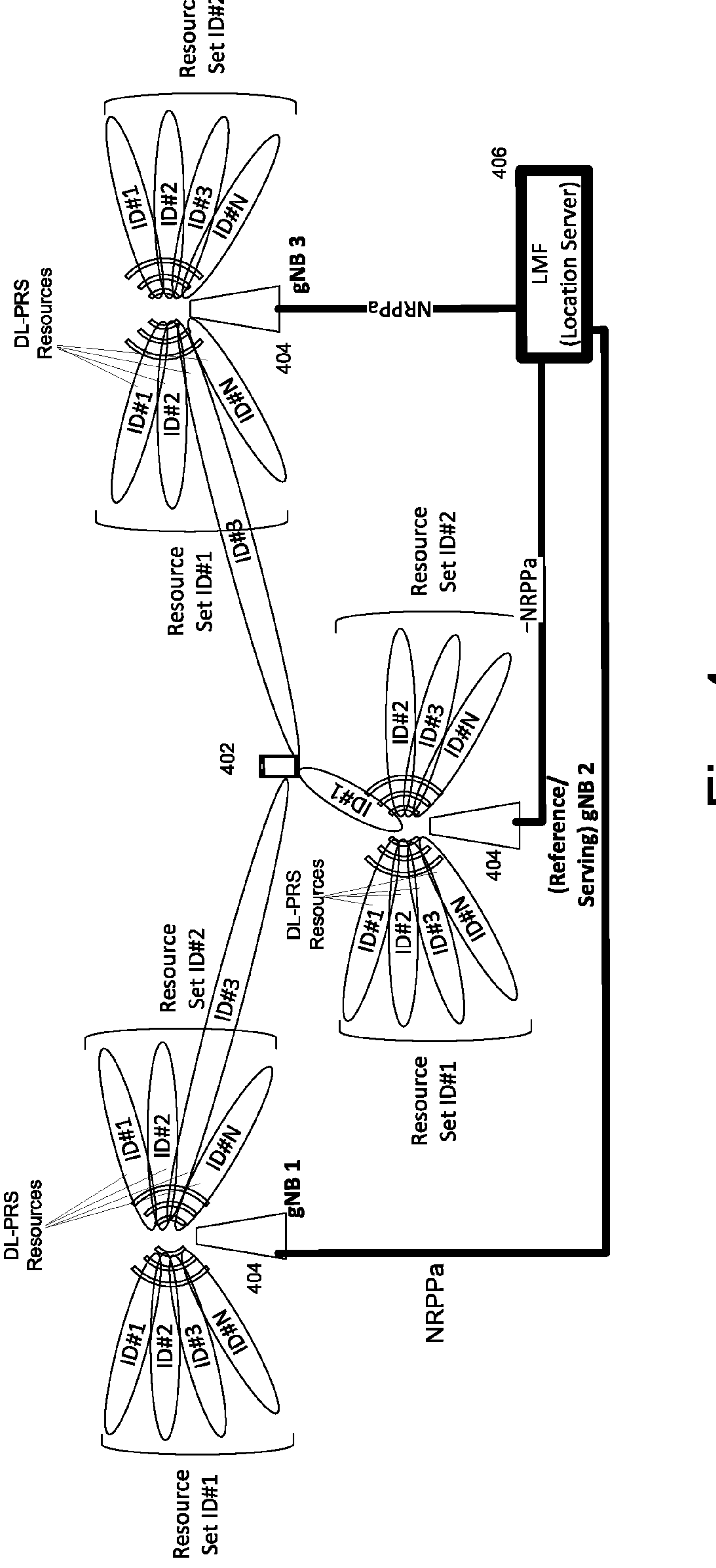
FIG. 4 is a schematic block diagram illustrating a network environment.

Referring to FIG. 4, by way of overview, a cellular device or user equipment (target UE) 402 (e.g., cell phone, smartphone, or comparable device) communicates with a network units or nodes (gNBs) 404 and a location management function (LMF) server 406 either included in the gNBs 404 or in data communication with the gNBs 404 via a public or private data network. Some techniques for performing low latency UE position estimating and reporting include downlink time difference of arrival (DL-TDOA), multi-cell round-trip time (RTT), and angle-based methods (DL-angle of departure (AoD) and uplink-angle of arrival (UL-AoA)). However, performing low latency UE position estimating and reporting using unlicensed carriers/bands (the gNBs 404) is unsupported in the 5G network.

The PRS can be transmitted by different base stations 404 using beams over FR1 and FR2 as illustrated in FIG. 4, which is relatively different when compared to LTE where the PRS was transmitted across the whole cell. The PRS can be locally associated with a PRS Resource ID and Resource Set ID for a base station (TRP) 404. Similarly, UE positioning measurements such as Reference Signal Time Difference (RSTD) and PRS RSRP measurements are made between beams (e.g., between a different pair of DL PRS resources or DL PRS resource sets) as opposed to different cells as was the case in LTE. In addition, there are additional UL positioning methods for the network to exploit in order to compute the target UE's location.

Figure 5:
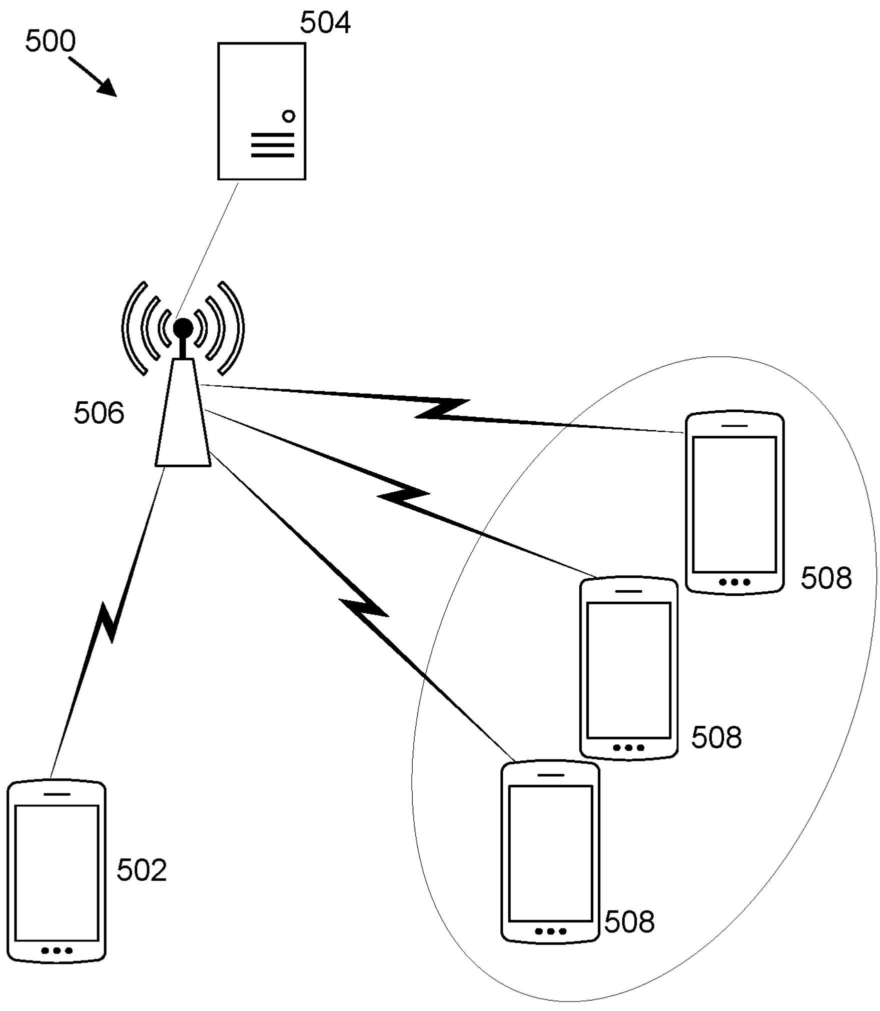
FIG. 5 is a schematic diagram of components of the network environment of FIG. 4.

In various embodiments, referring also to FIG. 5, a network system 500 includes the target UE 402, the LMF server 406, and the gNB 404. The gNB 404 is in data communication with the target UE 402 and other UEs 502 in a defined area relative to the target UE 402 and/or the gNB 404. The system 500 provides enhancements for performing RAT-based positioning using new radio (NR) in a number of unlicensed spectrum scenarios/deployments.

Positioning-related reference signals are used for positioning procedures/purposes in order to estimate a target UE's location. Examples include DL-position reference signal (PRS) and uplink (UL)-sounding reference signal (SRS). In various embodiments, the system 500, the shares triggered/initiated UE channel occupancy time (COT) values for low latency transmission of the positioning measurement reports and/or location estimates using an unlicensed carrier/band. The system 500 performs initiation of a random-access channel (RACH) transmission and/or configured grant (CG) transmission that meets NR-U criteria to enable UL transmission of a positioning measurement and/or location estimate report in an available COT. Also, the system 500 prioritizes the transmission of a positioning measurement report and/or location estimate using the current logical channel prioritization framework, which can be configured for both licensed and/or unlicensed UL transmissions. Non-transparent prioritization of NAS messages carrying positioning messages enable enhanced priority handling in the physical layer and medium access control (MAC) layer.

In various embodiments, the components within the system 500 enables the LMF server 406 to receive measurements and/or location estimate in a low latency manner over an unlicensed carrier (gNB 404).

In various embodiments, the system 500 enables positioning in unlicensed portions of the spectrum, more specifically, the target UE 402 coordinates and reports the positioning-related reference signal measurements in a given transmission opportunity and receives positioning measurement reports in a timely and efficient manner.

Figure 6:
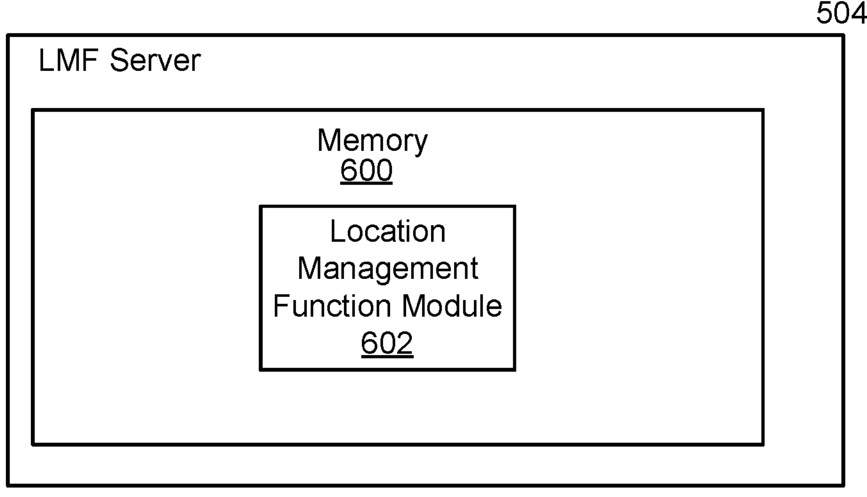
FIG. 6 is a schematic block diagram illustrating memory modules of components of the network components of FIG. 5.
Figure 6:
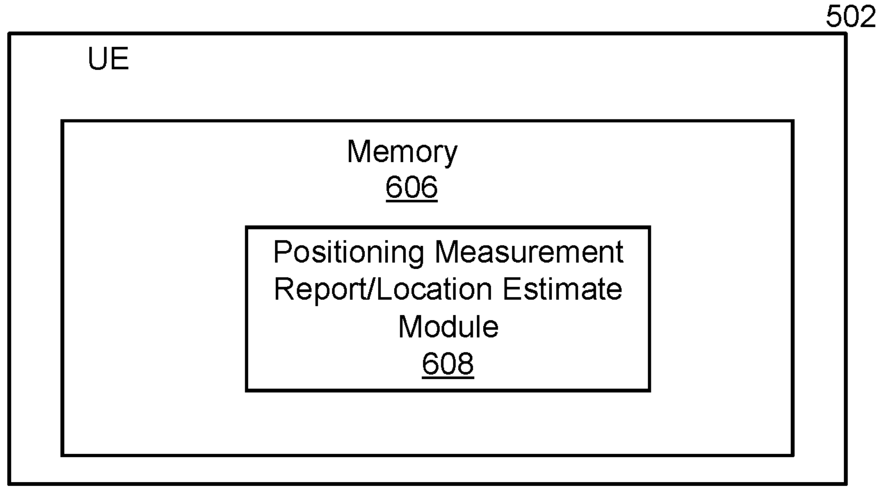

Referring to FIG. 6, the LMF server 406 includes the components of the network unit 104 shown in of FIG. 3 and also includes an LMF module 602 stored in memory 600. The target UE 402 includes the remote unit 102 shown in FIG. 3 and also includes a positioning measurement report/location estimate module 608 stored in memory 606. The modules 602 and 608 cause the respective processors to perform initiation of sharing of the target UE/gNB-initiated COT value for enabling transmission of positioning measurement reports depending on accuracy/latency requirements, which forms part of associated positioning quality of service (QOS) of a particular positioning application or service. Additionally, the system 500 uses RACH or CG-based reporting to enable transmission of the positioning measurement reports and/or location estimates within an initiated COT provided that a data volume threshold and COT requirements are satisfied based on size of the positioning measurement report.

Positioning Measurement/Location Estimate Reporting Based on COT Sharing

In various embodiments, for UL report transmission, the target UE 402 may initiate a COT value or wait until a next available COT to provide the UL positioning reports and/or location estimate. DL-PRS-based measurements or DL-PRS burst measurements (e.g. DL-TDOA, DL-AOD) report from the target UE 402 to the LMF server 406 are transmitted in the same COT, provided the positioning measurements are available and ready for reporting, if for example at least the following condition is met: maximum channel occupancy time (MCOT)≥PRS window size+time to the next positioning measurement/location estimate reporting+reporting window size. If the condition cannot be met, then the target UE 402 waits until the next available transmission opportunity (COT) to transmit the positioning measurement report.

The following types of reporting are supported in order for a target UE 402 to transmit the positioning measurement report within an available COT.

- Immediate: the LMF server 406 commands/triggers the target UE 402 within the same or previous COT to report the available measurements within the current COT or a next available COT.
- Periodical: The target UE 402 may provide periodic location information reports with the same time interval between two consecutive reports. The interval also indicates the response time requirement for the first location information report. The UE report includes amounts of 1, 2, 4, 8, 16, 32, 64, or infinite/indefinite number and report intervals include intervals of 1, 2, 4, 8, 10, 16, 20, 32, and 64 seconds.
- Triggered: Triggered reporting is only applicable for the enhanced-centered, earth-fixed (E-CID) positioning. The target UE 402 provides requested location information and/or the target UE 402 or the gNB 404 provides the radio resource management (RRM) measurements each time the primary cell (Gnb) has changed.
- Event-triggered: The reporting is triggered based on a configured event, e.g. entering or leaving a pre-defined area.

In various embodiments, the LMF server 406 uses past statistics related to COT availability including timestamps relating when the COT was initiated, COT duration, etc. to configure an optimal amount of measurements for reporting within the required response times. In one example, the target UE 402 reports the timestamp when the COT was initiated, COT duration, average COT duration, etc. to the LMF server 406 as part of the report or statistics. The report and statistics may be signalled together in the same NRPPa message otherwise in separate NRPPa messages based on determined latency and periodicity.

In the case of the LMF server 406 requesting previous UE initiated COT statistics from the target UE 402, the LMF server 406 uses a new Information Element (IE) UECOTinformation within the long term evolution (LTE) positioning protocol (LPP) message RequestLocationInformation to request the target UE 402 to provide such UE initiated COT statistical information. The request may be reported using for example the LPP ProvideLocationInformation message. In the case of the LMF server 406 requesting previous gNB-initiated COT statistics from the target UE 402, the LMF server 406 may for example use a new IE gNBCOTinformation within the NRPPa message PositioningInformationRequest signalling to request the NG-RAN node to provide the gNB-initiated COT statistical information. The gNB-initiated COT statistical information may be reported using for example the NRPPa message PositioningInformationResponse message. COT statistical information helps the LMF server 406 to align and configure the appropriate target UE response times based on the positioning techniques and COT timings.

In various embodiments, if the gNB 404 and LMF server 406 are co-located, or if the gNB 404 has LMU capabilities or if the gNB 404 has a full set or partial/subset of functionality of the LMF server 406 (location server), then the gNB-LMF requests the target UE 402 for past statistical UE initiated COT information using MAC CE or RRC signalling.

In various embodiments, the time instance in which positioning measurements are ready for reporting and the initiation of the COT may vary and, in some cases, may not meet the positioning latency (time to first fix (TTFF)) requirements. Therefore, the target UE 402 indicates to the gNB 404 (via RRC, UCI, MAC CE) or the LMF server 406 (via LPP) that the target UE-initiated COT can be shared among other nearby UEs in the same area. For example, the area may be defined based on system information area defined for system information block (SIB) messages or based on the previous positioning reports and/or location fixes from these UEs 502. In various embodiments, the UEs 502 within the same area can each transmit their separate positioning reports using the COT shared by the initiating target UE 402.

In various embodiments, the gNB 404 indicates to the other UEs 502 performing positioning (aside from the COT initiating UE) that the target UE-shared COT has been activated. The shared information may include corresponding timing information indicating when the UE-shared COT is to expire.

The target UE 402 transmits its own positioning measurement report and/or location estimate to the LMF server 406 via LPP signalling, e.g. using ProvideLocationInformation message. The positioning measurement report may also include the UE COT sharing activation and information to be used for positioning in the vicinity (with close proximity) of the target UE 402. The target UE 402 may understand if the UEs are nearby based on communication along a sidelink (SL)-interface (PC5), e.g. via a prior ranging exchange to determine the proximity of the others UE from the target UE 402. In various embodiments, the gNB 404 may instruct the target UE 402 to perform UE initiated COT sharing based on apriori course location information (e.g. cell ID, zone, etc.) of the other UEs 502. The instructions may include a flag activating/deactivating UE COT sharing and the COT sharing may include information such as timestamp of the start of the UE COT sharing, timer indicating time elapsed/remaining for UE COT sharing.

The nearby UEs 502 receive the COT sharing activation and information via, for example, group common downlink control information (DCI) signalling from the gNB 404 or the LMF server 406. In one embodiment, the COT sharing information including whether the COT can be shared among other UEs 502 performing positioning can be signalled in a dedicated manner by the LMF server 406 to the gNB 404 via NRPPa signalling.

In various embodiments, the gNB 404 broadcasts the COT sharing activation and information using positioning/normal SIB or UE-specific RRC signalling to the nearby UEs 502, in the event that the gNB 404 is co-located with the LMF server 406, if the gNB 404 has LMU capabilities, or if the gNB 404 has a full set or partial/subset of the LMF module 602. The nearby UEs 502 then utilize the target UE initiated COT to transmit an UL measurement/location estimate report.

In various embodiments, the other UEs 502 uses the UE-shared COT provided that their transmission are non-overlapping in time-frequency so as to not interfere with the subsequent UL transmissions of the target UE 402. The subsequent UL transmissions may be based on further transmission of UL positioning messages or normal UL control or data messages. This can be achieved through implementation or gNB configured criteria provided to the other UEs 502, such as, without limitation, threshold duration for transmission of UL positioning reports for UEs 502.

In some embodiments, the UE that is initiating the COT explicitly indicates if and when the COT can be used by the gNB 404 to transmit to other UEs 502 and/or receive UL channel/signals from the other UEs 502. In various embodiments, the remaining COT duration is indicated by the target UE 402 as available for the other UEs 502. In an alternate implementation, exact symbols and/or slots are indicated as being available to be used by the other UEs 502 for transmission of their reports to the gNB 404.

In alternative implementation, the LMF server 406 may request the gNBs involved in performing a configured positioning technique (e.g. DL-TDOA or Multi-RTT) to initiate a gNB-initiated COT sharing for the purposes of transmitting the DL-PRS over the scheduled resources. For example, the LMF server 406 may provide an indication to the serving gNB to initiate a gNB initiated shared COT.

Positioning Measurement/Location Estimate Reporting Based on Based on RACH and CG Criteria In various embodiments, the gNB 404 configures the UEs 402, 502 with RACH (Message A or Message 3) or CG for positioning reporting over the unlicensed carrier in order to enable the transmission of the positioning report in the available COT. This may also extend to other positioning messages sent over the UL including provide assistance data signalling, or provide capabilities signalling.

The LMF server 406 configures specific measurements based on the desired positioning technique to be reported, such as, without limitation, measurements that are applicable to DL-TDOA, NR E-CID, DL-AoD or Multi-RTT. The gNB 404 and the LMF server 406 exchange signalling to determine whether the LMF server 406 should configure a small size measurement report that meets the criteria for UL transmission using RACH resources.

In various embodiments, the positioning measurement report sent on Message A or Message 3 is based on the PRS measurements of the previously established RRC connection. The fidelity of the positioning measurement report depends on whether the UE was connected to the same gNB and on the time difference between the two connections. In various embodiments, the report is based on single synchronization signal block (SSB) detection of multiple cells before initiating the RACH procedure.

In various embodiments, small data transmissions are used to transmit UL positioning messages, which may include the measurement/location estimate report, provide assistance data signalling, or provide capabilities signalling. SDT-RACH and SDT may be used to split the positioning report over multiple segments in an available COT. The LMF server 406 and the gNB 404 perform alignment on the RACH message size limit as well as the CG periodicity with respect to the LMF report configuration and periodicity.

In various embodiments, the target UE 402 may share its initiated COT and the related timing/expiration information with other nearby UEs 502 along the SL interface (PC5). The UEs 502 within the same area can each transmit their CG-based positioning reports using the COT shared by the initiating target UE 402.

UL Positioning Message Prioritization for Licensed and Unlicensed Operations

In various embodiments, lower layer prioritization is identified for transmitting UL messages using the licensed and unlicensed bands. The priority of an UL LPP message to be considered for logical channel prioritization (LCP) procedure is indicated. The priority can be mapped according the positioning service levels, where for example the highest positioning service level (Level 7) could have the highest priority (Priority 0 or 1).

In one embodiment, the target UE 402 utilises a non-transparent priority level when mapping the positioning UL messages to the higher priority signal radio bearers. The current mechanism utilises signalling radio bearer (SRB) #2 to carry all NAS messages using the downlink control channel (DCCH) logical channel including positioning LPP messages, which is a lower priority radio bearer when compared to RRC messages carried on SRB #0 and SRB #1. The explicit priority indication introduced LPP positioning NAS messages to be transmitted on the UL are relevant for positioning messages (e.g. ProvideLocationInformation) which have stringent latency requirements and are transmitted in a given COT. The explicit priority allows such NAS positioning messages to be piggy backed on SRB #0 and SRB #1, which have a higher priority for UL transmission. This enables NAS messages contained positioning information to be elevated to a higher priority and thus be transmitted in SRB #0 or SRB #1, which would be otherwise transmitted over SRB #2 with a lower priority.

In various embodiments, the LMF server 406 and the gNB 404 can align on configuring the target UE 402 using signalling over the NRPPa interface with a short PUSCH duration in order to transmit the latency critical positioning report/location estimate. In one embodiment, the positioning measurement report/location estimate is configured by the gNB/LMF to transmit the report on PUSCH with a higher priority index (e.g. priority index 1 for low latency reporting).

In various embodiments, when a new transmission is performed, the MAC entity selects the logical channels for each UL grant that satisfy all the following conditions:

- the set of allowed Subcarrier Spacing index values in allowedSCS-List, if configured, includes the Subcarrier Spacing index associated to the UL grant;
- maxPUSCH-Duration, if configured, is larger than or equal to the PUSCH transmission duration associated to the UL grant;
- configuredGrantType1Allowed, if configured, is set to true in case the UL grant is a Configured Grant Type 1;
- allowedServingCells, if configured, includes the cell information associated to the UL grant. Does not apply to logical channels associated with a DRB configured with PDCP duplication within the same MAC entity (i.e. CA duplication) when CA duplication is deactivated for this DRB in this MAC entity;

allowedCG-List, if configured, includes the configured grant index associated to the UL grant; and allowedPHY-PriorityIndex, if configured, includes the priority as described above (Priority 1 index) for the PUSCH transmission of the positioning message associated to the dynamic UL grant.

UL Positioning Message Prioritization for Unlicensed Operations

This embodiment allows for positioning priority classes to enable low latency UL transmission of positioning messages in the unlicensed band such as the positioning measurement report/location estimate. The target UE 402 may be configured via DCI signalling based on the LBT type, which can follow either Type 1 or Type 2 uplink channel access mechanisms.

For type 1 uplink channel access on uplink, the gNB 404 configures the target UE 402 with a positioning channel access priority class received by the LMF server 406. The gNB 404 signals the channel access priority class for each logical channel and the UE must prioritize the positioning channel access priority (when choosing between normal and positioning channel access priority classes) of the logical channel(s) with MAC SDU multiplexed into the MAC PDU. The MAC control elements (CEs), except padding buffer status report (BSR), use the highest channel access priority class.

In various embodiments, the positioning channel access priority class is regarded as the same high priority as MAC CEs and use the highest channel access priority class.

For type 2 uplink channel access on uplink, the gNB 404 configures the target UE 402 with a positioning channel access priority class received by the LMF server 406. The target UE 402 selects logical channels (independent of any positioning information) with any channel access priority class of the logical channel(s) with MAC SDU multiplexed into the MAC PDU. Type 1 and type 2 UL channel access can support autonomous uplink, where autonomous uplink transmissions are allowed or enabled on preconfigured resources.

In various embodiments, Type 1 and Type 2 channel access mechanisms apply to dynamically scheduled UL resources. UE/gNB initiated COT sharing for the low latency transmission of the measurement report to the LMF server 406 by a group of UEs location in a geographic area.

The system 500 uses NR-U criteria to enable the gNB 404 to configure RACH and CG transmissions in an available COT for the transmission of a positioning report and/or location estimate. This is also applicable to small data transmissions (SDT). Logical channel prioritization for NAS messages carrying positioning information may also be performed. The gNB 404 can also configure UL positioning channel access priority classes for positioning.

Figure 7:
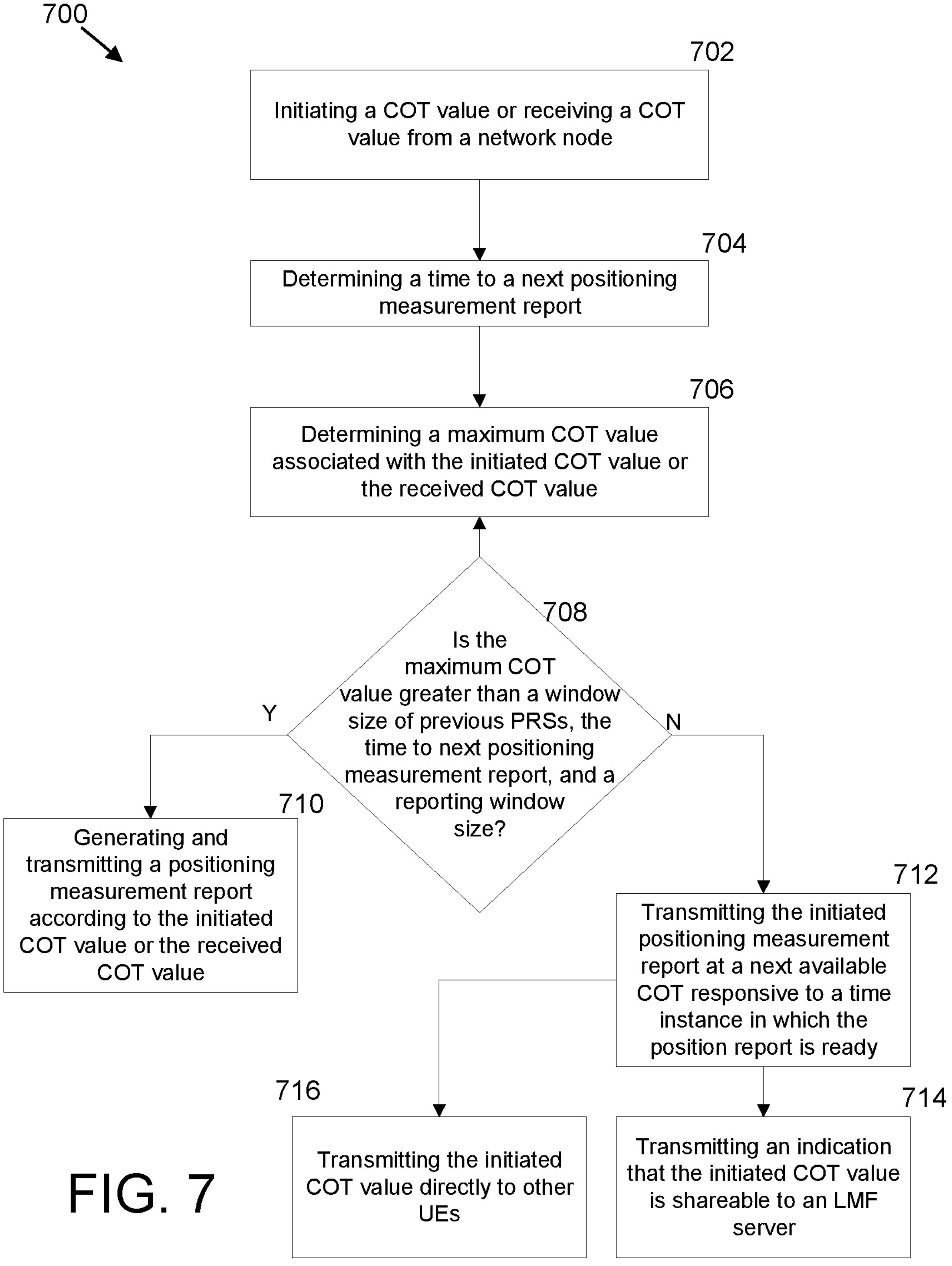
FIG. 7 is a flow diagram of a method performed by the modules of FIG. 6.

Referring to FIG. 7, a flow diagram of a method 700 performed by a UE is described. At a block 702, the UE initiates a COT value or receives a COT value from a network node. At a block 704, the UE determines a time to a next positioning measurement report. At a block 706, the UE determines a maximum COT value associated with the initiated COT value or the received COT value. At a decision block 708, Is the UE determines if the maximum COT value is greater than a window size of previous PRSs, the time to next positioning measurement report, and a reporting window size. If the maximum COT value is greater than a window size of previous PRSs, the time to next positioning measurement report, and a reporting window size, then at a block 710, the UE generates and transmits a positioning measurement report according to the initiated COT value or the received COT value. If the maximum COT value is not greater than a window size of previous PRSs, the time to next positioning measurement report, and a reporting window size, then at a block 712, the UE transmits the initiated positioning measurement report at a next available COT responsive to a time instance in which the positioning measurement report is ready. At a block 716, the UE transmits the initiated COT value directly to other UEs in a local area. At a block 714, the UE transmits an indication that the initiated COT value is shareable to an LMF server.

EMBODIMENTS

A. A method in a target user equipment (UE), the method comprising: determining a channel occupancy time (COT) value; determining a time to a next positioning measurement report; determining a maximum COT value associated with the determined COT value; generating and transmitting a positioning measurement report at the determined COT value responsive to the maximum COT being at least greater than a combination of a window size of a previously determined positioning reference signal (PRS), the determined time to the next positioning measurement report, and a predetermined reporting window size; and transmitting the generated positioning measurement report at a next available COT responsive to a time instance in which the positioning measurement report is ready and the determined COT value meeting a predefined position latency requirement responsive to the maximum COT value not being at least greater than the combination.

B. The method of A, further comprising transmitting an indication to a location management function (LMF) server via a network node that the determined COT value is shareable among other UEs located within a predefined area relative to the network node or the target UE in response to the maximum COT value not being at least greater than the combination.

C. The method of any of A or B, further comprising transmitting the determined COT value directly to the other UEs via a sidelink channel in response to the maximum COT value not being at least greater than the combination.

D. The method of C, wherein transmitting the determined COT value directly to the other UEs comprises transmitting expiration information associated with the initiated COT value.

E. The method of any of A-D, wherein the predefined area is based on one of system information area defined within one or more system information block (SIB) messages, previous positioning measurement reports from the target UE or the other UEs, or location fixes from the target UE or the other UEs.

F. The method of any of A-E, further comprising transmitting COT information, the COT information comprises a time stamp of when the COT value was initiated, a duration of a previous COT value, or an average duration of previous COT values G. The method of F, further comprising receiving a request for the COT information from the LMF server.

H. The method of G, wherein receiving the request is performed via a long-term evolution (LTE) positioning protocol (LPP) message.

I. The method of G, wherein receiving the request is performed via signaling being one of medium access control element (MAC-CE) or radio resource control RRC) in response to a network node and the LMF being co-located.

J. The method of any of A-I, wherein determining the COT value comprises initiating the COT value or receiving the COT value from a network node.

K. An apparatus comprising: a transceiver; a processor in communication with the transceiver; and a memory that stores code executable by the processor to: determine a channel occupancy time (COT) value; determine a time to a next positioning measurement report; determine a maximum COT value associated with the determined COT value; generate and transmit a positioning measurement report at the determined COT value responsive to the maximum COT being at least greater than a combination of a window size of a previously determined positioning reference signal (PRS), the determined time to the next positioning measurement report, and a predetermined reporting window size; and transmit the generated positioning measurement report at a next available COT responsive to a time instance in which the positioning measurement report is ready and the determined COT value meeting a predefined position latency value, responsive to the maximum COT value not being at least greater than the combination.

L. The apparatus of K, wherein the memory further stores code executable by the processor to transmit an indication to a location management function (LMF) server via a network node that the determined COT value is shareable among other UEs located within a predefined area relative to the network node or the target UE in response to the maximum COT value not being at least greater than the combination.

M. The apparatus of any of K or L, wherein the memory further stores code executable by the processor to transmit the determined COT value directly to the other UEs via a sidelink channel in response to the maximum COT value not being at least greater than the combination.

N. The apparatus of M, wherein transmitting the determined COT value directly to the other UEs comprises transmitting expiration information associated with the initiated COT value.

O. A network entity comprising: a transceiver; a processor in communication with the transceiver; and a memory that stores code executable by the processor to: receive a channel occupancy time (COT) value from a target user equipment (UEs) or a location management function server; and share the COT value with other UEs within a predefined area relative to the target UE or the network entity.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
determine a channel occupancy time (COT) value;
determine a time to a next positioning measurement report;
determine a maximum COT value associated with the determined COT value;
generate and transmit a positioning measurement report at the determined COT value responsive to the maximum COT being at least greater than a combination of a window size of a previously determined positioning reference signal (PRS), the determined time to the next positioning measurement report, and a predetermined reporting window size; and
transmit the generated positioning measurement report at a next available COT responsive to a time instance in which the positioning measurement report is ready and the determined COT value meeting a predefined position latency value, responsive to the maximum COT value not being at least greater than the combination.

2. The UE of claim 1, wherein the at least one processor is configured to cause the UE to store code executable by the processor to transmit an indication to a location management function (LMF) server via a network node that the determined COT value is shareable among other UEs located within a predefined area relative to the network node or the UE in response to the maximum COT value not being at least greater than the combination.

3. The UE of claim 2, wherein the at least one processor is configured to cause the UE to store code executable by the processor to transmit the determined COT value directly to the other UEs via a sidelink channel in response to the maximum COT value not being at least greater than the combination.

4. The UE of claim 3, wherein the at least one processor is configured to cause the UE to transmit the determined COT value directly to the other UEs by transmitting expiration information associated with the determined COT value.

5. A method performed by a user equipment (UE), the method comprising:
determining a channel occupancy time (COT) value;
determining a time to a next positioning measurement report;
determining a maximum COT value associated with the determined COT value;
generating and transmitting a positioning measurement report at the determined COT value responsive to the maximum COT being at least greater than a combination of a window size of a previously determined positioning reference signal (PRS), the determined time to a next positioning measurement report, and a predetermined reporting window size; and
transmitting the generated positioning measurement report at a next available COT responsive to a time instance in which the positioning measurement report is ready and the determined COT value meeting a predefined position latency requirement responsive to the maximum COT value not being at least greater than the combination.

6. The method of claim 5, further comprising transmitting an indication to a location management function (LMF) server via a network node that the determined COT value is shareable among other UEs located within a predefined area relative to the network node or the UE in response to the maximum COT value not being at least greater than the combination.

7. The method of claim 6, further comprising transmitting the determined COT value directly to the other UEs via a sidelink channel in response to the maximum COT value not being at least greater than the combination.

8. The method of claim 7, wherein transmitting the determined COT value directly to the other UEs comprises transmitting expiration information associated with the determined COT value.

9. The method of claim 6, wherein the predefined area is based on one of system information area defined within one or more system information block (SIB) messages, previous positioning measurement reports from the UE or the other UEs, or location fixes from the UE or the other UEs.

10. The method of claim 5, further comprising transmitting COT information, the COT information comprises a time stamp of when the COT value was initiated, a duration of a previous COT value, or an average duration of previous COT values.

11. The method of claim 10, further comprising receiving a request for the COT information from an LMF server.

12. The method of claim 11, wherein receiving the request is performed via a long-term evolution (LTE) positioning protocol (LPP) message, a medium control element (MAC-CE) message, or a radio resource control (RRC) message in response to a network node and the LMF server being co-located.

13. The method of claim 5, wherein determining the COT value comprises initiating the COT value or receiving the COT value from a network node.

14. The method of claim 5, wherein transmitting the generated positioning measurement report includes applying at least one of a plurality of prioritization rules for transmitting the positioning measurement report in licensed bands, unlicensed bands or combination thereof based on the COT value.

15. An apparatus for performing a network function, the apparatus comprising:

at least one memory; and at least one processor coupled with the at least one memory and configured to cause the apparatus to:

receive a channel occupancy time (COT) value from a target user equipment (UE) or a location management function server in response to a maximum COT value associated with the COT value being at least greater than a combination of a window size of a previously determined positioning reference signal (PRS), a determined time to a next positioning measurement report, and a predetermined reporting window size; and share the COT value with other UEs within a predefined area relative to the target UE or the apparatus.

16. A processor for wireless communication, comprising:

at least one controller coupled with at least one memory and configured to cause the processor to:

determine a channel occupancy time (COT) value;

determine a time to a next positioning measurement report;

determine a maximum COT value associated with the determined COT value;

generate and transmit a positioning measurement report at the determined COT value responsive to the maximum COT being at least greater than a combination of a window size of a previously determined positioning reference signal (PRS), the determined time to the next positioning measurement report, and a predetermined reporting window size; and transmit the generated positioning measurement report at a next available COT responsive to a time instance in which the positioning measurement report is ready and the determined COT value meeting a predefined position latency value, responsive to the maximum COT value not being at least greater than the combination.

17. The processor of claim 16, wherein the at least one controller is configured to cause the processor to transmit an indication to a location management function (LMF) server via a network node that the determined COT value is shareable among other UEs located within a predefined area relative to the network node or the UE in response to the maximum COT value not being at least greater than the combination.

18. The processor of claim 17, wherein the at least one controller is configured to cause the processor to transmit the determined COT value directly to the other UEs via a sidelink channel in response to the maximum COT value not being at least greater than the combination.

19. The processor of claim 18, wherein the at least one controller is configured to cause the processor to transmit the determined COT value directly to the other UEs by transmitting expiration information associated with the determined COT value.

20. The processor of claim 17, wherein the predefined area is based on one of system information area defined within one or more system information block (SIB) messages, previous positioning measurement reports from the UE or the other UEs, or location fixes from the UE or the other UEs.

* * * * *